(12) United States Patent
Puranik

(10) Patent No.: US 6,260,822 B1
(45) Date of Patent: Jul. 17, 2001

(54) SEAT ASSEMBLY FOR A GATE VALVE

(75) Inventor: D. Sudhir Puranik, Houston, TX (US)

(73) Assignee: Worldwide Oilfield Machine, Inc, Houston, TX (US)

( * ) Notice: Subject to any disclaimer, the term of this patent is extended or adjusted under 35 U.S.C. 154(b) by 0 days.

(21) Appl. No.: 09/477,251

(22) Filed: Jan. 4, 2000

(51) Int. Cl.$^7$ ...................................................... F16K 3/02
(52) U.S. Cl. ............................................. 251/328; 251/359
(58) Field of Search .................................. 251/328, 326, 251/170, 174, 359, 176

(56) References Cited

U.S. PATENT DOCUMENTS

| | | |
|---|---|---|
| 4,741,509 | 5/1988 | Bunch . |
| 4,878,651 | 11/1989 | Meyer . |
| 5,029,812 * | 7/1991 | Haynes .............................. 251/328 X |
| 5,201,872 | 4/1993 | Dyer . |
| 5,341,835 * | 8/1994 | Lanning, II ....................... 251/328 X |

* cited by examiner

Primary Examiner—Kevin Lee
(74) Attorney, Agent, or Firm—Kenneth L. Nash

(57) ABSTRACT

A seat assembly including preferably telescoping seating elements for use between a gate and a pocket in a gate valve body are disclosed. A seal is provided between the telescoping seating elements that is axially moveable and acts to seal with one or more sloping surfaces disposed on the seating elements. A spring acts to bias the seal towards the sloping surfaces so as to provide an initial seal. The sloping surfaces prevent movement of the seal in one axial direction. As line pressure increases the seal will move against the sloping surfaces with increased force to maintain the seal between the line or valve bore and the bonnet of the valve. A reverse pressure differential across the seal that is greater than the biasing force will cause the seal element to move in the opposite axial direction and bleed off the pressure across it. The seal may be metallic or have metal core with a coating of substantially non-elastic, non-permeable, chemically inert material of the type that is resistant to well bore fluids and other chemicals as well as unaffected by substantial changes in temperature.

21 Claims, 2 Drawing Sheets

SEAT ASSEMBLY FOR A GATE VALVE

BACKGROUND OF THE INVENTION

1. Field of the Invention

The present invention relates generally to gate valves and, more particularly, to apparatus and methods for a preferably telescoping seat assembly having an axially moveable seal element therebetween.

2. Description of the Background

Gate valves with telescoping seat assemblies have been in use for some time and have unique advantages. One advantage of this type of seat assembly in particular is the ability to provide a force on the seats that varies due to pressure differentials encountered. In this way, one is assured of a good seal with a wide range of pressure differentials. Another advantage is that friction due to movement of the gate may be kept at a minimum because the seat force applied to the gate may adjust as necessary to maintain the seal.

An exemplary type of telescoping valve seat assembly gate valve is shown in U.S. Pat. No. 4,878,651, issued Nov. 7, 1989, to F. W. Meyer, Jr., which is incorporated herein by reference, as a through conduit gate valve apparatus with a valve seat assembly that is field maintainable and which prevents the occurrence of pressure lock. Each valve seat assembly includes a retainer ring fixed in the valve body and a pressure responsive seat ring that seals with the gate member. The seat ring is responsive to fluid pressure in the valve flow passageways for maintaining and enhancing the face seal with the gate and to fluid pressure in the valve chamber for automatically venting the valve chamber to present occurrence of a pressure lock condition.

Another telescoping valve seat assembly gate valve is shown in U.S. Pat. No. 5,201,872, issued Apr. 13, 1993, to M. L. Dyer, that discloses a gate valve wherein bore pressure in the body cavity of the valve is isolated in the open and closed position. In the closed position, a double metal sealing barrier is provided across the gate. In the open position, the pressure is isolated from the stem packing and bonnet gasket by the seats on either side of the gate. Formation of hydrates in the body cavity is eliminated, and better retention of body grease is achieved during flow through the valves. Metal-to-metal seal surfaces are developed, thereby eliminating wear on the non-metal components and reducing torque requirements.

In some cases, it would be desirable to provide for another method of venting excess pressure in the bonnet. As well, it would be desirable to provide for increased or wider range of temperature operating conditions for a gate valve. In another application, it would be desirable if the downstream seat assembly provided a backup seal if the upstream seat assembly were to fail. Those skilled in the art have long sought and will appreciate the present invention which addresses these and other problems.

SUMMARY OF THE INVENTION

The present invention provides for a sealing assembly adapted for positioning between the body and the gate of a gate valve. The body defines a flow path therethrough and pockets in which the sealing assembly is positioned. The sealing assemblies on each side of the gate valve are preferably mirror images of each other so that only one is described herein and includes a substantially circular first seat element. As well, a substantially circular second seat element is provided. In one embodiment, the second seat element is telescopingly received with respect to the first seat element such that the first seat element and second seat element are each moveable in an axial direction with respect to the flow path. A sloping surface is provided for at least one of the first seat element or the second seat element. A substantially circular seal element is disposed between the first seat element and the second seat element adjacent to the sloping surface. A biasing spring is provided for biasing the circular seal toward the one axial direction with respect to the flow path for producing an initial seal between the sloping surface and the seal ring. In one embodiment, the circular seal element consists of metal and in another embodiment the circular seal element comprises metal and a coating of material that is non-permeable material substantially without memory that is, in other words, substantially inelastic. The coating is flexible or sufficiently malleable so as to form a seal with the sloping surfaces. If the seal ring consists of metal, then the seal ring is preferably of a different and preferably a softer metal than the sloping surfaces so as to be shaped somewhat for improving the seal therebetween. The seal is mounted for movement in an opposite axial direction in response to a pressure differential across the seal large enough to overcome the force of the biasing spring such that a reverse pressure differential produces flow between the sloping surface(s) and the seal element.

It is an object of the present invention to provide an improved seat assembly for a gate valve.

It is another object of the present invention to provide a seat assembly that includes a unidirectional seal element.

It is yet another object of the present invention to provide a seat assembly that operates at higher temperatures and pressures.

It is yet another object of the present invention to provide a seating assembly that will provide a backup downstream seal in case the primary upstream seal fails.

A feature of the present invention is an axially moveable sealing element that engages sloping surfaces between two seat elements.

Any listed objects, features, and advantages are not intended to limit the invention or claims in any conceivable manner but are intended merely to be informative of some of the objects, features, and advantages of the present invention. In fact, these and yet other objects, features, and advantages of the present invention will become apparent to those skilled in the art from the drawings, the descriptions given herein, and the appended claims.

While the present invention will be described in connection with presently preferred embodiments, it will be understood that it is not intended that the invention is limited to those particular embodiments but the descriptions given herein merely are to provide sufficient information such that one skilled in the art may practice one or more presently preferred embodiments of the invention, in accord with the patent statutes. Thus, the descriptions of the invention provided herein are not intended to limit the invention in any way. On the contrary, it is intended that all alternatives, modifications, and equivalents included within the spirit of the invention and as defined in the appended claims be encompassed as a part of the present invention.

DETAILED DESCRIPTION OF THE PREFERRED EMBODIMENTS

Figure 1:
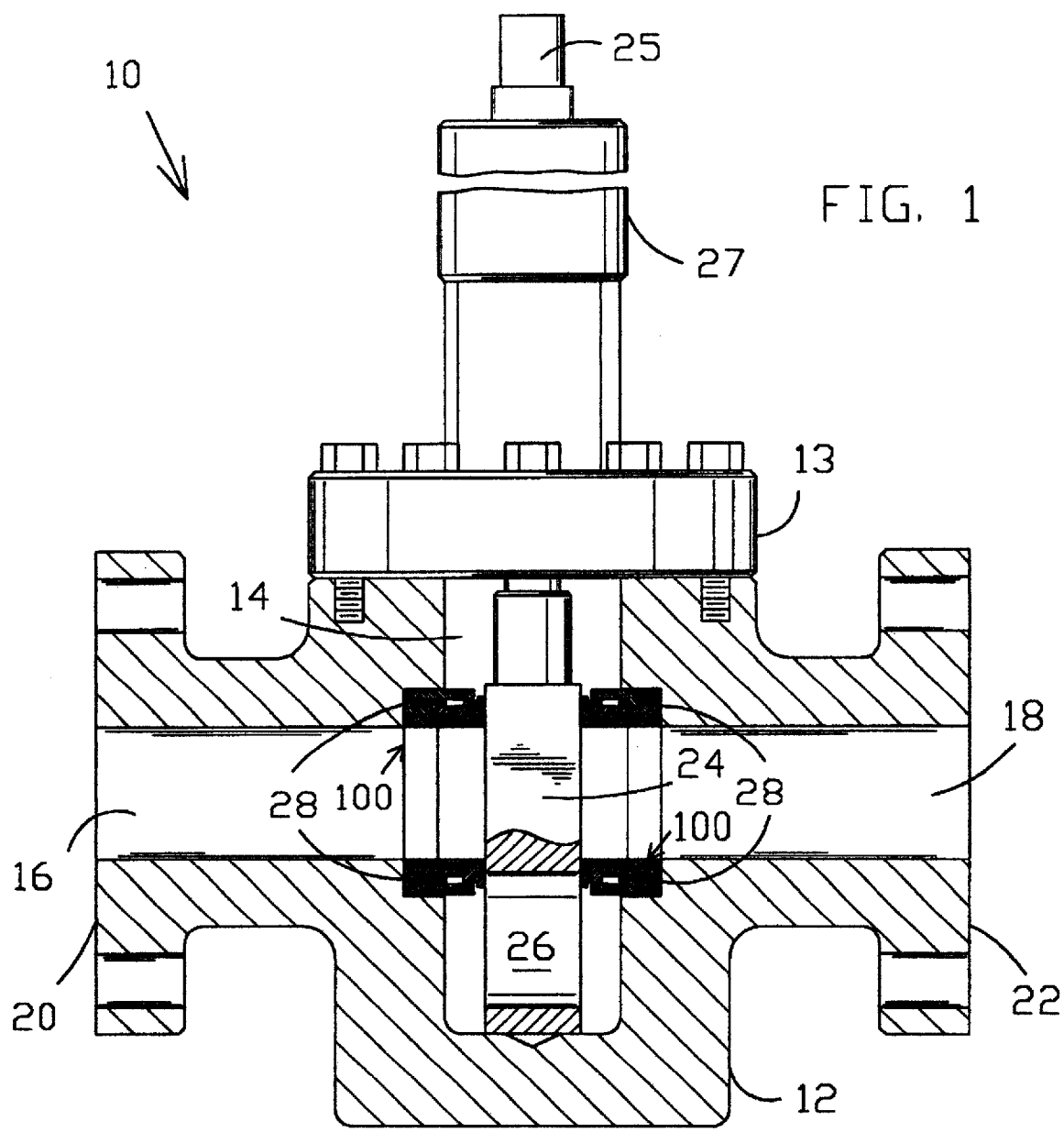
FIG. 1 is an elevational view, partially in section, of a gate valve in accord with the present invention.

Referring now to the drawing, and more particularly to FIG. 1, where a preferred embodiment of gate valve 10, in accord with the present invention, is illustrated. Gate valve 10 uses two preferably mirror image sets of telescoping seat assemblies such as seat assemblies 100 that have numerous advantages for operation with a gate valve as discussed hereinafter.

Gate valve 10 includes a valve body 12 with a removable bonnet or cap portion 13 that provides access to body cavity or gate chamber 14 which is formed within valve body 12 and contains the working gate valve components. Valve body 12 defines flow passageways 16 and 18 which are preferably aligned on a common axis and preferably form a straight through flow path wherein fluid flow is controlled. Depending on design, passageways 16 and 18 are typically designated as upstream and downstream passageways and may require connection in this manner. In a preferred embodiment of the invention, seat assemblies 100 are mirror images of each other and gate valve 10 may be mounted with either passageway 16 or 18 as the upstream passageway. Flanges 20 and 22 may be used to connect gate valve 10 in position although other means can be used for this purpose.

Within gate chamber 14 is gate 24 which moves at a right angle with respect to the axis of flow passageways 16 and 18 to thereby open and close gate valve 10. Preferably gate 24 is mounted so as to be a floating gate thereby allowing some axial movement of gate 24. This may be effected by leaving the bottom of gate 24 unattached and/or providing linkage to gate 24 that includes a slip joint or the like. Gate 24 is shown in the closed position and is in an open position when gate 24 moves upwardly, as shown in FIG. 1, and laterally with respect to flow passageways 16 and 18 so that gate passageway 26 is lined up with flow passageways 16 and 18. Thus, when gate 24 is in a downward position as shown in FIG. 1, the valve is closed and when gate 24 is in an upward position, the valve is open. It will be understood that the terms "upper", "lower", and the like, refer to the figures and are used for convenience only and that the same components or portions of them may be oriented in different ways in operation, storage, manufacturing, and so forth as known by those skilled in the art. The outer surfaces on gate 24 are preferably polished for sealing purposes as is known to those of skill in the art. Gate 24 is typically operated by some means such as rotation of valve stem 25 within upper housing 27 from the exterior of gate valve 10 to reciprocate gate 24 upwardly and downwardly. Other means for operating gate 24 are known to those of skill in the art.

Valve body 12 has formed therein enlarged recesses or pockets 28 that mate with seat assemblies 100 at the juncture of passageways 16 and 18 and chamber 14. Seat assemblies 100 cooperate with the pockets and gate to form a seal thereby preventing flow past gate 24 when gate 24 is closed. In a preferred embodiment, a metal-to-metal seal between gate 24 and valve seat assemblies 100 is formed as is known to those of skill in the art. The seal between seat assemblies 100 and pockets 28 may be of various types and include multiple seals including metal-to-metal and other types of seals as discussed hereinafter.

Figure 2:
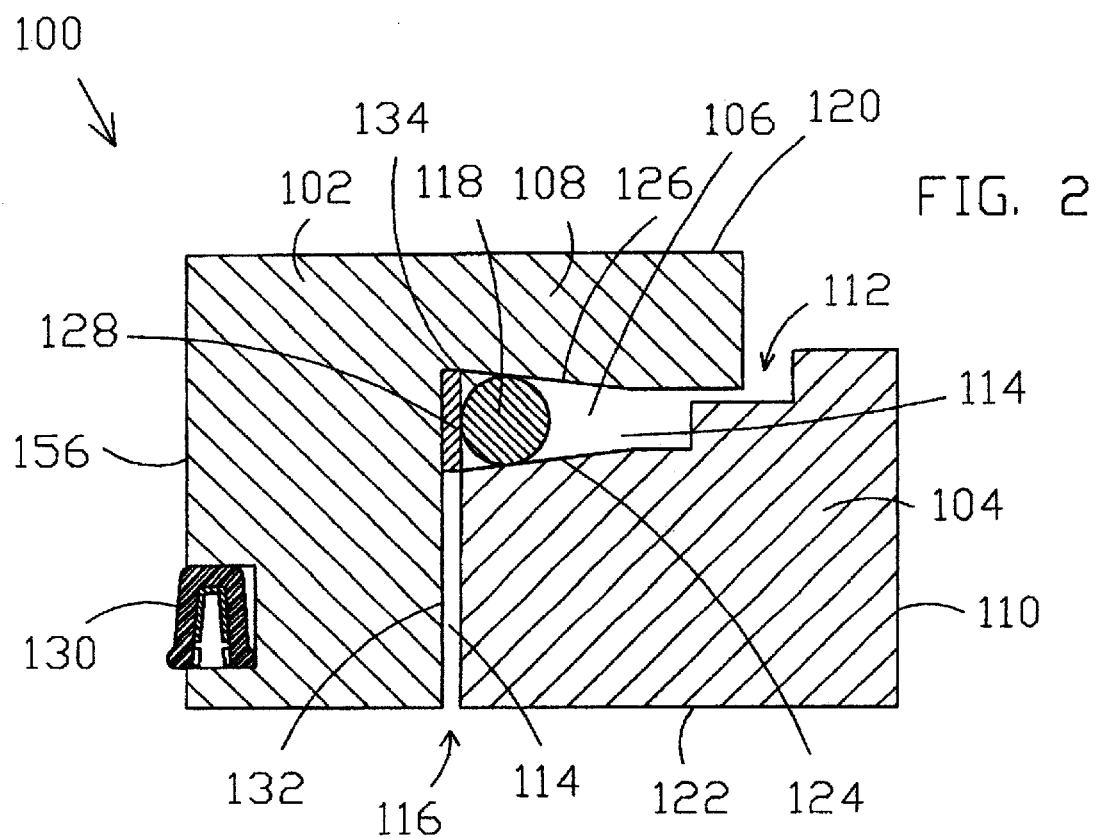
FIG. 2 is an enlarged elevational view, in section, of a portion of a seat assembly with seal element therebetween in accord with the present invention.

FIG. 2 discloses one preferred embodiment of seat assemblies 100 in accord with the present invention. It will be understood that the components are showed in substantially conceptual form for ease of understanding and are not intended to represent manufacturing dimensions, sizes, or details. Seating assembly 100 surrounds passageways 16 and 18 and is preferably circular in construction and preferably mounts into cylindrical shaped pockets 28. First seat element 102 and second seat element 104 are preferably telescopically interconnected such that second seat element 104 is sized to fit within first seat element 102 within receptacle 106 formed within extension 108. It will be noted that while the seating elements are preferably telescoping with each other, first seat element could be designed to fit within second seat element instead of as shown. Thus, there are no particular restraints on which seat element is interior with respect to the other seat element but in the presently preferred embodiment the seating arrangement is as shown. Surface 110 preferably seals with gate 24 with a metal-to-metal seal. Surface 110 may have various indentations or a designated surface area that may be larger or smaller than other surface area of the seating elements to effect a variable force acting against the gate so that the sealing force that pushes surface 110 against gate 24 is greater than force that would urge the two surfaces apart as is discussed at least in part in the above listed patents.

Chamber pressure is available along the top of seat assembly 100, as shown in FIG. 2, and may enter at 112 into passageway 114 and receptacle 106 between first seat element 102 and second seat element 104. Receptacle 106 is part of passageway 114. As well, pressure from the valve passageways 16 and/or 18 may enter at 116 into passageway 114. It will be understood that chamber pressure acts along upper surfaces 120 of seat assembly 100 and bore pressure acts along lower surfaces 122. Thus, a differential pressure may typically exist across seal element 118.

Seal element 118 is mounted between first seat element 102 and second seat element 104 within receptacle 106 and is positioned to isolate chamber pressure from line pressure such as pressure in one or both passageways 16 and 18. Sloping surfaces 124 and 126 define receptacle 106. Sloping surfaces have a slope that is offset with respect to the axis of passageways 16 and 18. As well, the slope is not at right angles with respect to the open and closing movement of gate 24. The angle of each sloping surface 124 and 126 may be different but in the preferred embodiment, are the same. It is possible that only one of the surfaces have a slope so that the opposite surface could be horizontal within the view of FIG. 1–3 or parallel to the axis of passageways 16 and 18. Sloping surfaces 124 and 126 are positioned opposite of each other. Seal element 118 engages sloping surfaces 124 and 126 to form a seal that isolates valve chamber pressure with bore or line pressure. The angle of each slopping surfaces can vary over a wide range, typically between about zero and about sixty degrees. In one presently preferred embodiment, the angle is about eighteen degrees but that may be changed as desired. As the angle decreases with respect to the axis of passageways 16 and 18, the sealing force acting on seal element 118 tends to increase due to mechanics of an inclined plane, assuming that the line pressure is greater than the valve chamber pressure. Preferably spring 128 is provided to bias seal ring or seal element 118 axially toward sloping surfaces 124 and 126 in the direction in which the slope of the angles of surfaces decreases thereby producing an initial contact and seal between sloping surfaces 124 and 126 and seal element 118. Spring 128 may be of various types such as a Belville spring.

Spring 128 may include several components, spacers, bushings, rings, and the like as desired to provide an initial seal force against seal element 118. Spring 128 is preferably circular and surrounds passageways 16 and 18 as does seal element 118 and first and second seat elements 102 and 104. Thus, preferably spring 128 applies a substantially uniform force around its circular perimeter.

Therefore seal element 118 is mounted so as to be moveable axially in the direction of spring 128 or in the direction of decreasing angles of sloping surfaces 124 and 126. In this way for some applications, seal element 118 may be used to vent pressure from valve chamber 14 into the passageways if the valve chamber pressure is higher than line pressure. This situation may occur if the line pressure is reduced. Other means for venting pressure are discussed in U.S. Pat. No. 4,878,651 that may or may not be used in connection with this feature. As well, additional seal elements such as metal-to-metal seats, metal rings, or seals such as seal 130, discussed subsequently, may be used along surface 132 between first seat element 102 and second seat element 104.

Seal element 118 is shown with a circular cross-section but may have other shapes such as oval or oblong and the shape may change or be malleable depending on the material of which seal element 118 is made. If seal element 118 is a metal, then it may preferably be a different type of metal as compared with that of sloping surfaces 124 and 126 so that conformance may occur to effect the seal. Thus, seal element 118 is preferably a softer metal, e.g., brass, assuming seal element 118 is comprised wholly of metal. It is undesirable for seal element 118 to be comprised of an elastomeric or permeable material such as is used in O-rings because that will tend to limit the pressure range and temperature operating range of gate valve 10.

Figure 3:
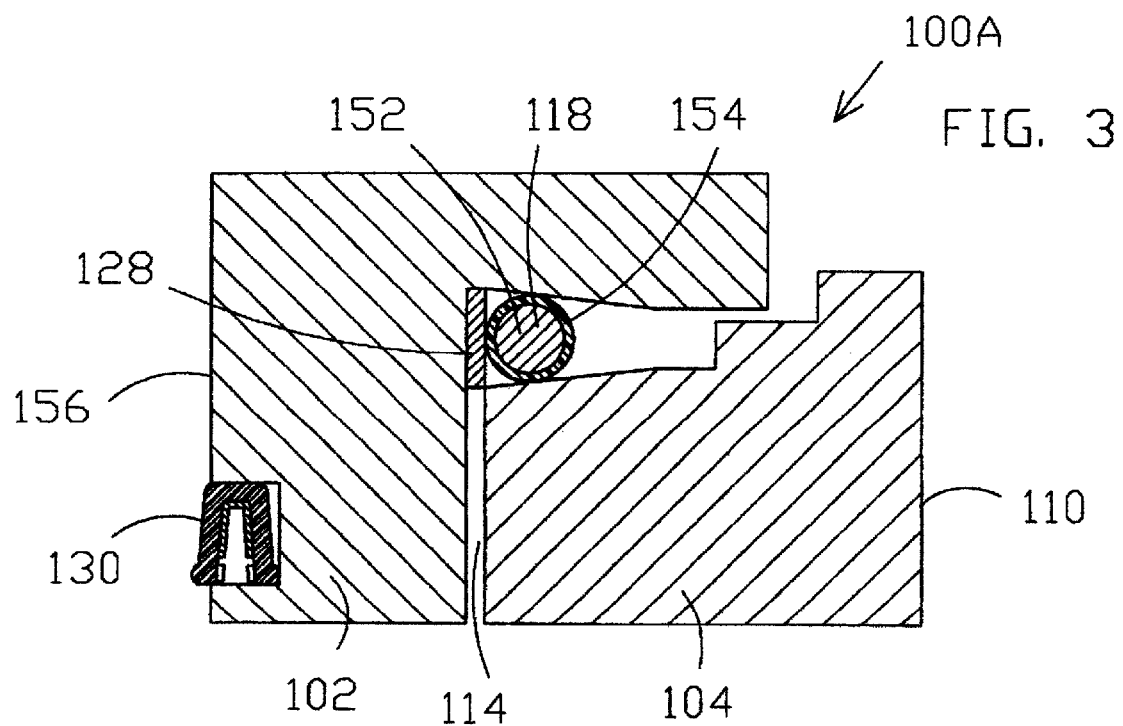
FIG. 3 is an enlarged elevational view, in section, of a portion of a seat assembly with a coated seal element therebetween in accord with the present invention.

FIG. 3 discloses another embodiment 100A of the present invention wherein seal element 118 is partially metallic with metallic inner core 152 and an outer coating 154 of non-metallic material. The non-metallic material may be a polymer or thermoplastic that has little or no memory such as PEEK (polyetheretherketone), PES (polyethersulfone), PTFE (polytetraflurorroetheylene), and the like. In other words, it is substantially non-elastic but is pliable or flexible enough to act as a good seal material. The selected material should also be non-permeable so as to avoid the problem that many O-rings have of absorbing gasses under pressure and subsequently expanding or exploding when the pressure is released. The non-metallic material should also have a high temperature rating and be resistant to caustic and acidic fluids and other fluids such as those found in oil and gas wells or pipelines. Various materials are available for this purpose.

Seal member 130 may be comprised of the same or similar type of material as outer coating 154. Seal member 130 is a unidirectional seal element and may be used for sealing between seat element 102 and valve body pocket 28. Additional seals including metal-to-metal seals, unidirectional seals, and the like but preferably not elastic O-ring seals may also be used in place of or in conjunction with seal 130 along pocket seal surface 156 of seat element 102.

In operation, pressure from the line will enter at 116 and act along the surfaces of passageway 114 to produce a force that creates a metal-to-metal seal at the gate along surface 110. Seal 130 and/or other seals such as metallic rings, additional seals such as seal 130, or metal-to-metal seals are used to seal with the valve pocket along surface 156. As discussed previously, seal ring 118 seals between seat elements 102 and 104. For the case where the valve is closed, and the upstream seating elements leak, the downstream seating elements are preferably designed to provide a backup seal. In this case, line pressure might be in upstream passageway 16 and a reduced or lower pressure may be in downstream passageway 18. If the upstream seating elements 100 leak, then the line pressure would also enter chamber 14. Although differential pressure would tend to allow leakage across downstream seating elements including seat element 118, it may be desirable to have an additional seal along passageway 114 that would be activated, at a minimum, by pressure acting on gate 24 which, as stated previously, is preferably floating to permit some axial movement. The substantially large surface area of gate 24 produces a significant force along surfaces 114 so as produce a seal therein to activate the particular type of seal therein as necessary. As well, one or more seals would act to seal between the valve pocket and the downstream seat element 102.

In summary, the present invention has numerous valuable advantages including extended temperature and pressure applications as well as the possibility to provide venting between the valve chamber and the line, and also the possibility of providing a downstream backup seal in case the primary upstream seal fails.

The foregoing disclosure and description of the invention is illustrative and explanatory thereof, and it will appreciated by those skilled in the art, that various changes in the size, shape and materials as well as in the details of the illustrated construction or combinations of features of the various actuator elements may be made without departing from the spirit of the invention.

What is claimed is:

1. A sealing assembly adapted for positioning between the body and the gate of a gate valve, said body defining a flow path therethrough, said assembly comprising:
    a substantially circular first seat element;
    a substantially circular second seat element, said second seat element being telescopingly received with respect to said first seat element such that said first seat element and said second seat element are each moveable in an axial direction with respect to said flow path;
    a sloping surface for at least one of said first seat element or said second seat element;
    a substantially circular seal element disposed between said first seat element and said second seat element adjacent said sloping surface; and
    a biasing spring for biasing said circular seal toward one axial direction with respect to said flow path.

2. The sealing assembly of claim 1, wherein:
    said circular seal element consists of metal.

3. The sealing assembly of claim 1, wherein:
    said circular seal element comprises metal.

4. The sealing assembly of claim 1, further comprising:
    a coating surrounding said seal element, said coating being comprised of a non-permeable and flexible material.

5. The sealing assembly of claim 1, further comprising:
    said seal element having a metallic core.

6. The sealing assembly of claim 1, further comprising:
    a coating surrounding said seal element, said coating being comprised of a flexible material having no memory.

7. The sealing assembly of claim 1, further comprising:
    said sealing element having a metallic outer surface comprised of a first metal, said sloping surface being comprised of a second metal, and said first metal being softer than said second metal so as to effect a seal.

8. A sealing assembly adapted for positioning between the body and the gate of a gate valve, said body defining a flow path therethrough, said assembly comprising:

a first seat element;

a second seat element, said second seat element being telescopingly received with respect to said first seat element such that said first seat element and said second seat element are moveable with respect to each other;

a sloping seal surface disposed on at least one of said first seat element and said second seat element;

a seal element mounted between said first seat element and said second seat element for engagement with said sloping seal surface such that said circular seal element is moveable in an axial direction but is prevented from movement in one axial direction by said sloping surface so as to effect a seal between said sloping surface and said circular seal element.

9. The sealing assembly of claim 8, further comprising:

a spring for biasing said seal element toward said one axial direction.

10. The sealing assembly of claim 8, further comprising:

said non-elastic seal element is comprised of a first metal, and said sloping surface being comprised of a second metal, and said first metal is softer than said second metal.

11. The sealing assembly of claim 8, further comprising:

said seal element comprising a pliable material.

12. The sealing assembly of claim 8, further comprising:

said seal element comprising a non-permeable material.

13. The sealing assembly of claim 8, further comprising:

said seal element forming a unidirectional seal with said sloping seal surface.

14. The sealing assembly of claim 8, further comprising:

a second sloping seal surface, said seal element being disposed between said sloping seal surface and said second sloping seal surface.

15. A sealing assembly adapted for positioning between the body and the gate of a gate valve, said body defining a flow path therethrough, said assembly comprising:

a first seat element mounted so as to surround said flow path;

a second seat element mounted so as to surround said flow path, said first seat element and said second seat elements being mounted between said body and said gate such that said first seat element and said second seat element are moveable axially with respect to each other;

a seal element mounted between said first seal element and said second seal element, said seal element being comprised of a substantially non-elastic material; and a biasing spring for biasing said circular seal into sealing engagement with said first seat element and said second seat element.

16. The sealing assembly of claim 15, further comprising:

a first sloping seal surface disposed on at least one of said first seat element and said second seat element.

17. The sealing assembly of claim 16, further comprising:

a second sloping seal surface, said seal element being engageable with said first and second sloping seal surfaces.

18. The sealing assembly of claim 16, further comprising:

said seal element being a unidirectional seal.

19. A seal element for a sealing assembly adapted for positioning between the body and the gate of a gate valve, said body defining a fluid flow path therethrough, said assembly comprising:

at least one sloping sealing surface defined by said sealing assembly, said sealing surface being angled with respect to an axis of said flow path;

said seal element being mounted adjacent to said at least one sloping sealing surface and being moveable in an axial direction such that said at least one sloping sealing surface prevents axial movement of said seal element in one direction, said seal element being comprised of a material having little or no memory; and a biasing spring for biasing said seal toward said one axial direction with respect to said flow path for engagement with said at least one sloping surface and for producing an initial seal between said seal element and said at least one sloping sealing surface, said seal element being mounted for movement in an opposite axial direction in response to a pressure differential across said seal element large enough to overcome said biasing spring such that said pressure differential produces fluid flow between said at least one sloping surface and said seal element.

20. The seal element of claim 19, further comprising:

said seal element being comprised of an outer coating of non-metallic material and an inner core of metallic material.

21. The seal element of claim 19, further comprising:

said seal element being comprised of a first material, said at least one sloping surface being comprised of a second material, said first material having a different hardness than said second material to aid in forming a seal therebetween.

* * * * *